United States Patent [19]

Croke

[11] Patent Number: 5,069,145
[45] Date of Patent: Dec. 3, 1991

[54] PLASTIC REFUSE DISPOSAL SYSTEM

[75] Inventor: William M. Croke, Huntington Beach, Calif.

[73] Assignee: Atlantic Richfield Company, Los Angeles, Calif.

[21] Appl. No.: 622,876

[22] Filed: Dec. 5, 1990

[51] Int. Cl.⁵ ............................ F23G 5/00; F23G 7/00
[52] U.S. Cl. .................................... 110/244; 110/106; 110/232; 110/346; 110/347; 122/2
[58] Field of Search ............... 110/106, 347, 346, 232, 110/244; 122/2

[56] References Cited

U.S. PATENT DOCUMENTS

| | | | |
|---|---|---|---|
| 2,385,508 | 9/1945 | Hammond | 110/232 X |
| 4,798,342 | 1/1989 | Williams | 110/106 X |
| 4,932,594 | 6/1990 | Kim | 110/106 X |

Primary Examiner—Edward G. Favors
Attorney, Agent, or Firm—Michael E. Martin

[57] ABSTRACT

Plastic and similar shreddable materials are reduced to small particles and pneumatically conveyed to the combustion space of a marine boiler for inceneration to dispose of such materials aboard ship. A granulator apparatus reduces the material to particulates having a maximum particle size of about 0.50 inches for conveyance by the pneumatic conveyor through a conduit which has penetrated a boiler wall in the vicinity of the combustion space.

5 Claims, 1 Drawing Sheet

5,069,145

PLASTIC REFUSE DISPOSAL SYSTEM

BACKGROUND OF THE INVENTION

1. Field of the Invention

The present invention pertains to a plastic refuse disposal system which grinds plastic refuse and the like into fine particles which are pneumatically conveyed into the furnace space of a steam boiler for incineration as a method of disposal which is particularly suited for shipboard use.

2. Background

The increasing use of plastic and other non-metallic and combustible materials for containers and the like has placed ever-growing burdens on disposal systems and methods. Disposal of these materials into the environment from shipboard activities is at least inconsiderate to the environment if not illegal in some jurisdictions. Accordingly, there has been a need for an improved means of collection and disposal of shipboard-produced plastic and other combustible, non-metallic refuse. The present invention provides a relatively uncomplicated yet effective system for shipboard disposal of refuse, particularly plastic and other combustible materials.

SUMMARY OF THE INVENTION

The present invention provides an improved refuse disposal system, particularly adapted for use in conjunction with ship's steam boilers and the like. In accordance with one important aspect of the present invention, plastic refuse and similar materials which may be reduced to relatively small particles and combusted in a furnace are disposed of by a system which includes a particle size reducing or granulator unit and a pneumatic conveying system for conveying the granulated plastic and other combustible material refuse to the firebox or furnace space of a boiler, in particular a propulsion system boiler for a marine vessel. In accordance with another important aspect of the present invention, a refuse disposal system is provided wherein granular refuse is injected into the firebox of a marine boiler by a pneumatic conveyor arrangement and wherein the boiler has a forced air system which provides a supplemental injection air and minimizes the chance of incineration of material in or clogging of the pneumatic-conveying conduit near its outlet into the boiler.

Those skilled in the art will recognize the above-described advantages and superior features of the present invention, together with other important aspects thereof upon reading the detailed description which follows in conjunction with the drawing.

DESCRIPTION OF A PREFERRED EMBODIMENT

Figure 1:
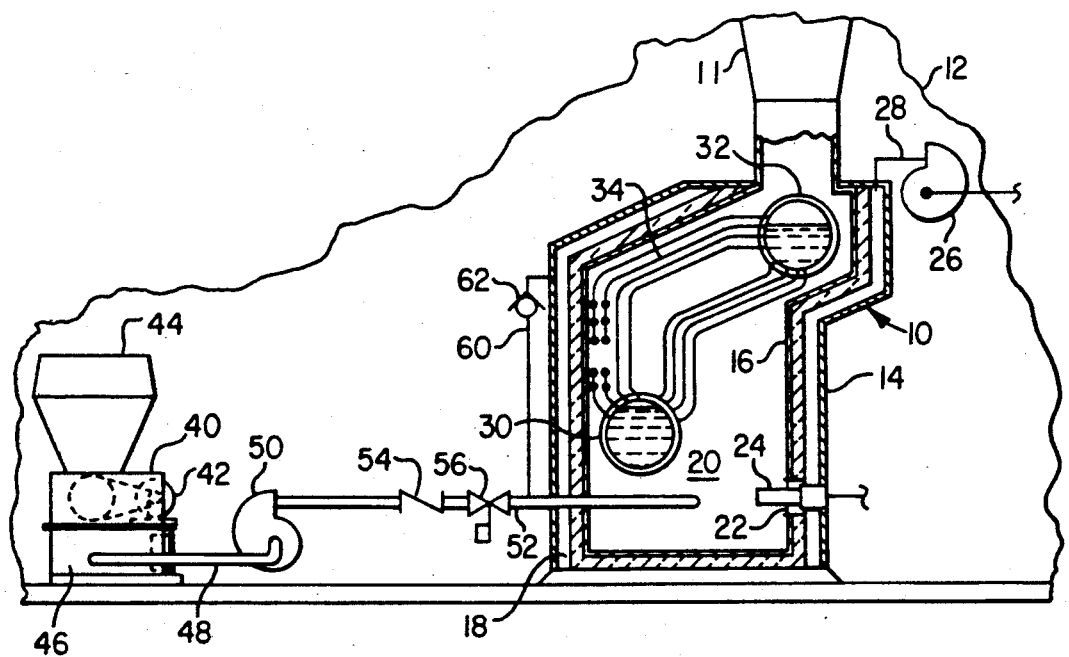
FIG. 1 is a schematic illustration of the refuse disposal system of the present invention.

In the description which follows, like parts are marked throughout the specification and drawing with the same reference numerals, respectively. The drawing figures are not necessarily to scale and certain elements are shown in schematic form in the interest of clarity and conciseness.

Referring to FIG. 1, there is illustrated an arrangement of a main propulsion system boiler 10 disposed in a machinery space 12 of a steam-propelled marine vessel and the like. The boiler 10 is of a type which includes an outer housing or box structure 14 and an inner housing or firebox structure 16, which are separated at least over a portion of their extent by a space 18 through which forced air is circulated and which exits into the interior fire or furnace space 20 through a passage 22 disposed around a burner assembly 24. The burner assembly 24 is adapted to provide for combustion of a suitable gaseous or liquid fuel within the space 20 and to mix with combustion air provided to the space 20 through the passage 22. A suitable blower 26 is adapted to receive combustion air from a source, not shown, for introduction into the space 18 by way of a conduit 28. Those skilled in the art will recognize that the boiler 10 and the arrangement for introducing combustion air into the space 20 is primarily exemplary and other specific arrangements of natural draft and forced draft combustion air type boilers may be used in conjunction with the refuse disposal system of the present invention.

Figure 2:
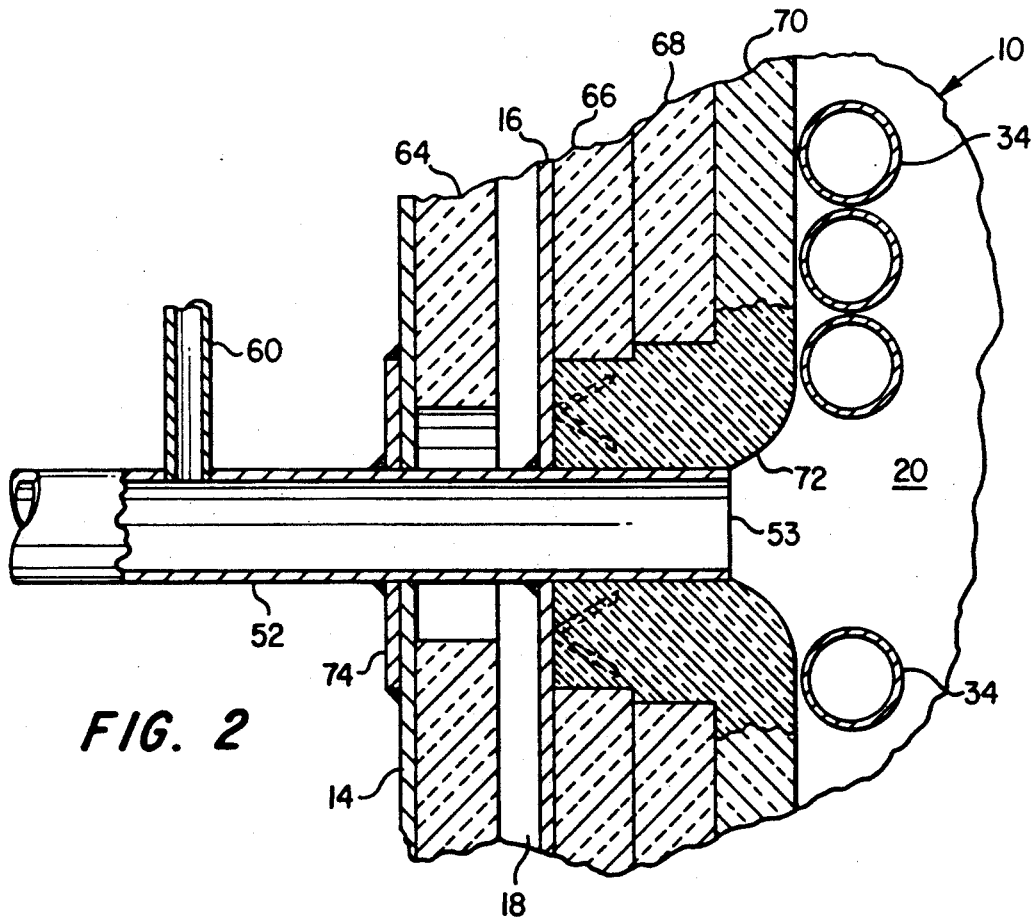
FIG. 2 is a detail section view showing the outlet end of the refuse injection conduit at its point of entry into the boiler.

The boiler 10 also includes interior structure comprising spaced-apart drums 30 and 32, which are interconnected by an array of tubes 34 in a conventional manner for conducting water therethrough, which is converted to steam for use in propelling various shipboard machines. At least some of the tubes 34 are disposed adjacent the inner wall of the firebox 16 of the boiler 10, as shown in FIG. 2. The boiler 10 includes a flue gas chimney 11 for conducting flue gases away from the combustion space 20. In a conventional manner, the combustion of fuel in the space 20 heats water in the drum 30 and the conduits 34 to generate steam for collection in the drum 32 for conduction to its end use.

Referring further to FIG. 1, in accordance with the present invention, there is provided an improved refuse disposal system, particularly adapted for disposal of plastic and similar materials which are capable of being converted into granular form and incinerated in the furnace space 20. The disposal system includes a granulator apparatus, generally designated by the numeral 40, which is suitably driven by motor means 42. The granulator 40 includes a material inlet hopper 44 and a granulated or particulate material discharge hopper 46 for conducting material which has been reduced from various sized objects to a substantially granular form for conduction by way of a conduit 48 to a pneumatic conveying system, including a centrifugal blower 50 and a conveyor conduit 52. The conduit 52 is connected to the boiler 10 by way of a check valve 54 and a gate valve 56. Pneumatically conveyed granular material is introduced into the space 20 by way of the conduit 52 through the boiler outer box 14 and inner box 16. Certain features of one preferred embodiment of the connection between the conduit 52 and the boiler 10 are illustrated in FIG. 2 and will be described in further detail therein.

In order to minimize the chance of lodging residual granular material in the conduit 52 at or near its point of community of the conduit 60 with the space 20, pressure air is conducted to the conduit 52 by way of a scavenging air conduit 60, which is connected to the conduit 52 as illustrated in FIGS. 1 and 2. The scavenging air conduit 60 is also in communication with the forced draft air space 18 as indicated in FIG. 1 and a check valve 62 is preferably interposed in the conduit 60 between the conduit 52 and the point of entry into the space 18. The arrangement of the scavenging air conduit 60 assures that granular or particulate material does not lodge in the conduit 52 near its outlet end 53 when the disposal system is shut down so as to prevent incineration of material in or near the outlet end of the conduit which might clog the conduit during periods of nonuse.

FIG. 2 illustrates a preferred arrangement of penetration of the boiler 10 with the conduit 52 by providing an opening in the outer box 14, an outer layer of insulation block 64, the inner box 16 and multiple layers of insulation block 66 and 68, as well as a layer of tile 70. The penetration point is preferably such as to be at a place where at least some of the boiler tubes 34 are spaced apart sufficiently to permit injection of the pneumatically conveyed particulate material into the space 20 without collection of same on the boiler tubes. The distal end 53 of the conduit 52 is secured by suitable refractory material 72 which is packed around the tube and the opening provided in the insulation blocks 66, 68 and the refractory or tile layer 70. The conduit 52 is also secured to the outer casing 14 by a reinforcement plate 74. The pneumatic conveying blower 50 is operated at a pressure which is at least slightly greater than the pressure in the space 20 as provided by the blower 26 so that the material being conveyed through the conduit 52 is injected into the space 20. However, during periods of startup or shutdown of the disposal system the conduit 52 is scavenged of any residual material in the vicinity of the distal end 53 by the provision of the scavenging air conduit 60 which is in communication with a source of pressure air from the blower 26 such as by way of the space 18. The check valve 62 prevents flow of granular material in the opposite direction through the conduit 60.

In a preferred mode of practicing the present invention, the apparatus 40 may be of a type manufactured by Cumberland Engineering, Division of John Brown Plastics Machinery of Providence, R.I., as their general purpose granulator, Model 8X12 Premium. This apparatus is adapted to operate with a 5 h.p., 440 v, 3-phase motor and to process plastic materials and the like into particles having not greater than about 0.50 inches nominal maximum dimension. The apparatus 40 is hard-piped to the blower 50, which may be of a type manufactured by Sterling Blower Company as their Model 512-03ED, with a closed-face wheel. Blower operating pressure is in the range of 18-21 inches WG at 300-450 c.f.m. discharge flow rate. The blower 50 is hard-piped to the boiler 10, with a 2.50-3.00 inch diameter conventional steel pipe.

In operation in a marine boiler operating at conventional combustion temperatures, a throughput of 150-200 lbs. per hour may be obtained with almost instant incineration in the boiler combustion space 20 with no adverse effects in the way of collection of residue or the like on the boiler tubes 34 or on the interior walls of the fire box 16. With normal boiler furnace draft pressures in the range of 7-20 inches WG, the conduit 52 is kept clean of granular material in the vicinity of the end 53 during periods of inactivity of the apparatus 40 and during startup and shutdown to minimize the change of clogging the conduit with partially incinerated material.

Although a preferred embodiment of the present invention has been described in detail herein, those skilled in the art will recognize that various substitutions and modifications may be made to the apparatus and method without departing from the scope and spirit of the invention as recited in the appended claims.

What is claimed is:

1. A system for shipboard use in disposing of plastic material and the like by reducing the material to particulates which may be incinerated, said system comprising:
   a granulator apparatus for reducing plastic material and the like to granular particulates;
   pneumatic conveyor means for conveying said particulates to a discharge conduit, said discharge conduit being connected for discharging said particulates to the interior of a boiler;
   a marine boiler, including a fire box space for combustion of a fuel to generate steam and means defining a forced draft combustion air flow space, said discharge conduit being arranged such as to discharge said particulates into said fire box space for incineration to dispose of said material; and
   a scavenging air conduit opening into said discharge conduit for conducting air into said discharge conduit to scavenge particulates from said discharge conduit generally at a point of penetration of said discharge conduit into said boiler, said scavenging air conduit being in communication with said combustion air flow space for conducting forced draft combustion air to said discharge conduit from said combustion air flow space.

2. A system for shipboard use in disposing of plastic material and the like by reducing the material to particulates which may be incinerated, said system comprising:
   a granulator apparatus for reducing said material to particulates having a maximum linear dimension of about 0.50 inches;
   pneumatic conveyor means for conveying said particulates to a discharge conduit, said discharge conduit being disposed for discharging said particulates to the interior of a boiler;
   a marine boiler, including means defining a forced draft combustion air flow space and a combustion space for combustion of a fuel to generate steam, said discharge conduit being arranged such as to penetrate a wall of a boiler for disposing of said material;
   conduit means opening into said discharge conduit for conducting pressure air into said discharge conduit to scavenge particulates from said discharge conduit generally at the point of penetration of said discharge conduit into said boiler; and
   means for conducting pressure air to said conduit means comprising pressure air supply means for supplying combustion air to said combustion air flow space, said conduit means being in communication with said combustion air flow space for receiving combustion air therefrom for scavenging said particulates from said discharge conduit.

3. A method for disposing of plastic material and the like on a ship having a steam-generating boiler, said method comprising the steps of:
   providing apparatus for granulating said material to reduce said material to particulates;
   providing pneumatic conveying means for conveying said particulates to said boiler;
   providing conduit means connected to said pneumatic conveying means and penetrating a wall of said boiler for conveying said particulates into a combustion space of said boiler; and reducing said material to particulates using said apparatus and conveying said particulates through said pneumatic conveying means and said conduit means to said boiler for combustion with fuel in said combustion space to dispose of said plastic material and the like.

4. The method set forth in claim 3, including the step:
injecting scavenging air into said conduit means to scavenge said particulates from said conduit means in the vicinity of the point of penetration of said conduit means with said boiler.

5. The method set forth in claim 3 wherein:
said material is reduced to particulates having a maximum dimension of about 0.50 inches.

* * * * *